United States Patent [19]
Narusawa

[11] Patent Number: 5,956,623
[45] Date of Patent: Sep. 21, 1999

[54] RADIO SELECTIVE CALLING RECEIVER

[75] Inventor: Hideki Narusawa, Shizuoka, Japan

[73] Assignee: NEC Corporation, Tokyo, Japan

[21] Appl. No.: 08/878,349

[22] Filed: Jun. 18, 1997

[30] Foreign Application Priority Data

Jun. 18, 1996 [JP] Japan ................................. 8-156639

[51] Int. Cl.⁶ .................................................. H04B 7/00
[52] U.S. Cl. .................................. 455/38.3; 340/825.44; 455/343
[58] Field of Search ................................. 455/575, 38.1, 455/38.3, 38.2, 230, 343; 340/825.44, 311.1, 825.47

[56] References Cited

U.S. PATENT DOCUMENTS

| | | | |
|---|---|---|---|
| 4,369,443 | 1/1983 | Giallanza et al. | 340/825.47 |
| 4,577,315 | 3/1986 | Otsuka | 370/311 |
| 4,768,031 | 8/1988 | Mori et al. | 340/825.44 |
| 4,860,005 | 8/1989 | DeLuca et al. | 340/825.44 |
| 4,894,649 | 1/1990 | Davis | 340/825.44 |
| 5,140,698 | 8/1992 | Toko | 455/76 |
| 5,189,400 | 2/1993 | Schultz | 340/636 |
| 5,212,811 | 5/1993 | Kuge et al. | 455/73 |
| 5,404,578 | 4/1995 | Kuge et al. | 455/73 |
| 5,819,170 | 10/1998 | Norimatsu | 455/343 |
| 5,832,366 | 11/1998 | Umetsu | 455/38.3 |
| 5,842,121 | 11/1998 | Norimatsu | 455/343 |

FOREIGN PATENT DOCUMENTS 4-7921  1/1992  Japan .

*Primary Examiner*—Reinhard J. Eisenzopf
*Assistant Examiner*—Charles N. Appiah
*Attorney, Agent, or Firm*—Scully, Scott, Murphy and Presser

[57] ABSTRACT

A radio selective calling receiver which has at least a switch operated by a user to perform operations including resetting of sound generation, ON/OFF of display, time correction, and read access to a stored message and whose switch interrupt processing performed by operating the switch is performed by starting a main clock, includes a radio unit operation determination unit for determining whether a radio unit which demodulates a radio signal received from a base station is performing a reception operation. If the radio unit operation determination unit determines that the radio unit is performing the reception operation, switch interrupt processing is not performed even when the user operates the switch. With this arrangement, an erroneous operation due to harmonic noise generated from the main clock in the reception operation and noise generated from the CPU operated by the main clock during the reception operation of the radio unit can be prevented.

2 Claims, 3 Drawing Sheets

RADIO SELECTIVE CALLING RECEIVER

BACKGROUND OF THE INVENTION

1. Field of the Invention

The present invention relates to a radio selective calling receiver and, more particularly, to a radio selective calling receiver having a plurality of switches for performing operations including resetting of sound generation, ON/OFF of display, time correction, and read access to a stored message.

2. Description of the Prior Art

In a conventional radio selective calling receiver of the type having a plurality of operation switches, when a user operates, e.g., a switch for reading out a message from a memory, a control unit actuates not a subclock which is always operating for time updating and other normal processing operations but a main clock to perform high-speed switch interrupt processing, thereby reading out and displaying the message without any delay. Such switch interrupt processing is performed regardless of whether the radio unit is performing a reception operation.

When the user operates a switch for reading out a message from the memory or correcting the time during the reception operation of the radio unit of the radio selective calling receiver, the main clock is actuated. For this reason, errors may be generated in the readout message, or extraction of the ID (identification number) of the radio selective calling receiver of the user may fail to result in an incoming call reception failure due to harmonic noise generated from the main clock or noise generated from the CPU which is operated by the main clock.

SUMMARY OF THE INVENTION

It is an object of the present invention to provide a radio selective calling receiver which inhibits switch interrupt processing during the reception operation of the radio unit not to actuate the main clock, thereby preventing an erroneous operation due to harmonic noise generated from the main clock in the reception operation and noise generated from the CPU operated by the main clock.

In order to achieve the above object, according to the present invention, there is provided a radio selective calling receiver which comprises at least one switch operated by a user to perform operations including resetting of sound generation, ON/OFF of display, time correction, and read access to a stored message and whose switch interrupt processing performed by operating the switch is performed by starting a main clock, comprising a radio unit operation determination unit for determining whether a radio unit which demodulates a radio signal received from a base station is performing a reception operation, wherein if the radio unit operation determination unit determines that the radio unit is performing the reception operation, switch interrupt processing is not performed even when the user operates the switch.

With this arrangement, an erroneous operation due to harmonic noise generated from the main clock in the reception operation and noise generated from the CPU operated by the main clock during the reception operation of the radio unit can be prevented.

In addition, in the radio selective calling receiver, if the radio unit operation determination unit determines that the radio unit is performing the reception operation, information representing inhibition of switch interrupt processing is displayed. With this arrangement, the user can immediately recognize inhibition of switch interrupt processing.

DETAILED DESCRIPTION OF THE PREFERRED EMBODIMENT

The embodiment of the present invention will be described below with reference to the accompanying drawings.

Figure 1:
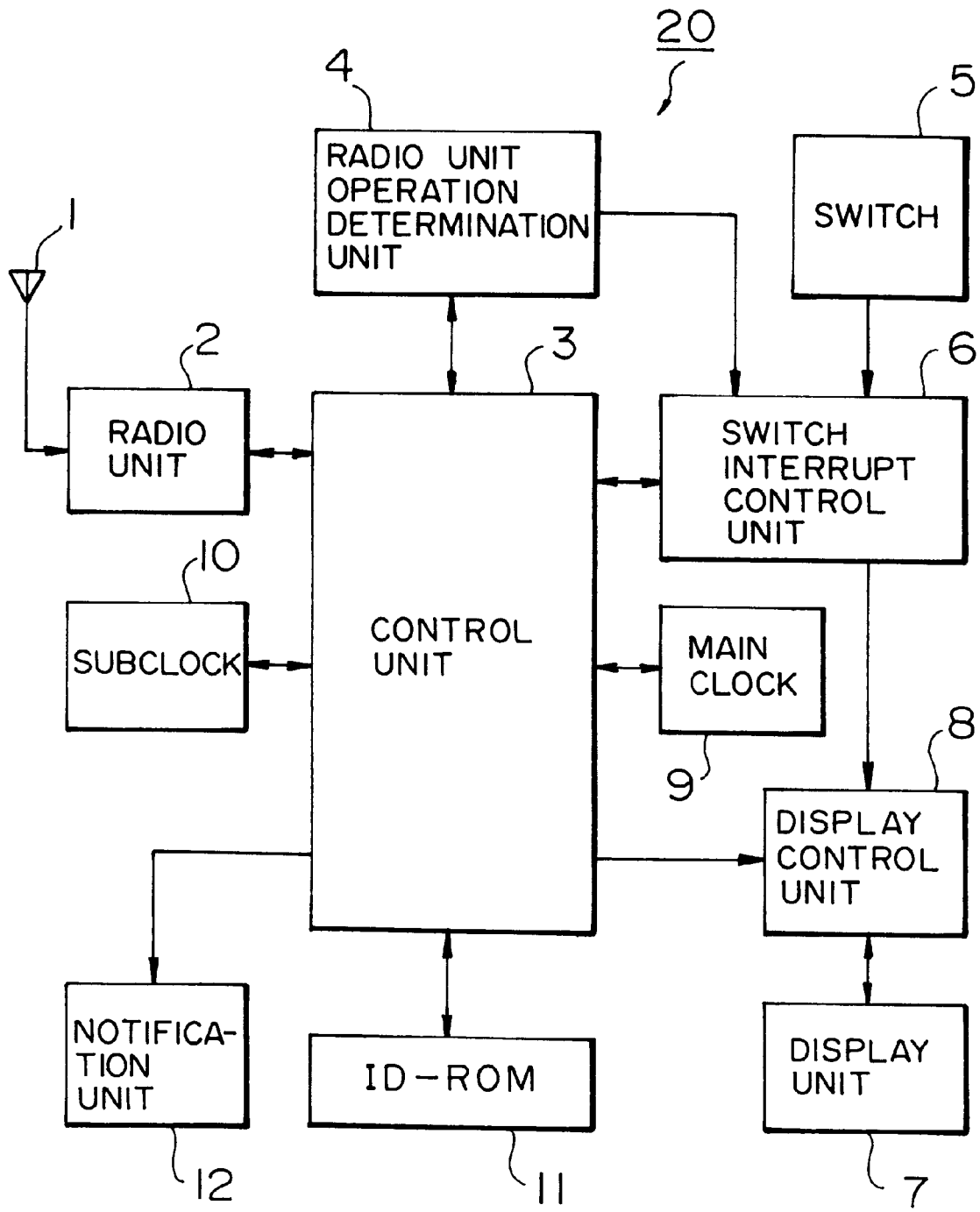
FIG. 1 is a block diagram showing a radio selective calling receiver according to an embodiment of the present invention.

Referring to the block diagram in FIG. 1, a radio selective calling receiver 20 according to this embodiment comprises a radio unit 2 for demodulating a radio signal received from a base station (not shown) by an antenna 1, a control unit 3 for performing all sequence control in the radio selective calling receiver 20, a radio unit operation determination unit 4 for determining whether the radio unit 2 is performing a reception operation, a switch 5 for operating resetting of sound generation, ON/OFF of display, time correction, read access to a stored message, or the like, a switch interrupt control unit 6 for controlling interrupt of the switch 5, a display unit 7 for displaying information of switch interrupt inhibition, a message, and the like, a display control unit 8 for turning on and driving the LCD of the display unit 7, a main clock 9 which is started when the control unit 3 performs high-speed processing or switch interrupt processing, a subclock 10 which is always operating for time updating or normal processing by the control unit 3, an ID-ROM 11 which stores the identification number (ID) of the radio selective calling receiver 20 in advance, and a notification unit 12 for notifying the radio selective calling receiver 20 of a call.

The radio unit operation determination unit 4 checks the operation state of the radio unit 2 whose operation is controlled by the control unit 3. If it is determined that the radio unit 2 is performing the reception operation, the radio unit operation determination unit 4 controls the switch interrupt control unit 6 and causes the switch interrupt control unit 6 to transmit a switch interrupt inhibit signal to the control unit 3. Upon receiving the switch interrupt inhibit signal, the control unit 3 does not start the main clock 9. The switch interrupt control unit 6 controls the display control unit 8 to make the display unit 7 display information representing inhibition of switch interrupt processing.

If the radio unit operation determination unit 4 determines that the radio unit 2 is not performing the reception operation, the switch interrupt control unit 6 is controlled to transmit a switch interrupt enable signal to the control unit 3. Upon receiving the switch interrupt enable signal, the control unit 3 enables to start the main clock 9, thereby allowing high-speed switch interrupt processing in case that the user operates the switch. During switch interrupt processing, the switch interrupt control unit 6 controls the display control unit 8 to cause the display unit 7 to display information representing that the switch interrupt operation is being performed.

A method of determining, by the radio unit operation determination unit 4, whether the radio unit 2 is performing the reception will be described next with reference to FIG.

3. The operation of the radio unit 2 is controlled in accordance with a control signal transmitted from a radio unit control block 3a including a decoder, which is arranged in the control unit 3. More specifically, when the power supply is turned on, the radio unit control block 3a transmits a control signal to the radio unit 2 in synchronism with the subclock 10 such that the radio unit 2 is turned on/off at a predetermined timing corresponding to the transmission format of each protocol sent from the base station, thereby minimizing battery consumption of the radio selective calling receiver 20. Under such intermittent operation control of the radio unit 2 by the radio unit control block 3a, the radio unit 2 is turned on in synchronism with a radio wave transmitted from the base station and containing a self call signal. The radio unit operation determination unit 4 monitors the control signal output from the radio unit control block 3a to the radio unit 2, thereby determining whether the radio unit 2 is performing the reception operation.

Instead of determining the progress in the reception operation on the basis of the ON state of the radio unit 2, the radio unit operation determination unit 4 may monitor a signal transmitted from the radio unit 2 to the control unit 3 and determine the reception operation upon detecting the same call signal as the self call signal from the base station.

Figure 2:
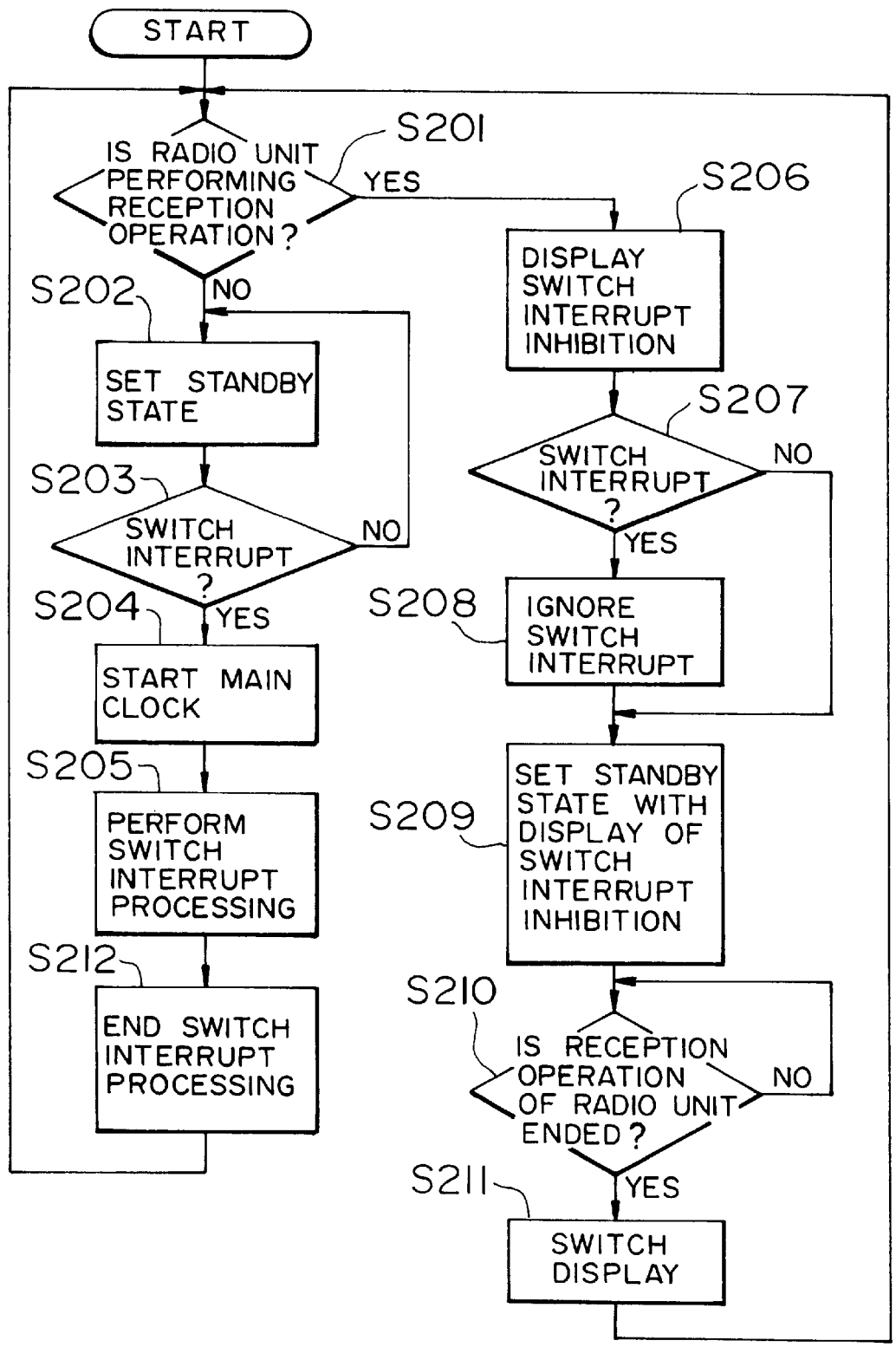
FIG. 2 is a flow chart for explaining the operation of the radio selective calling receiver according to the embodiment.
Figure 3:
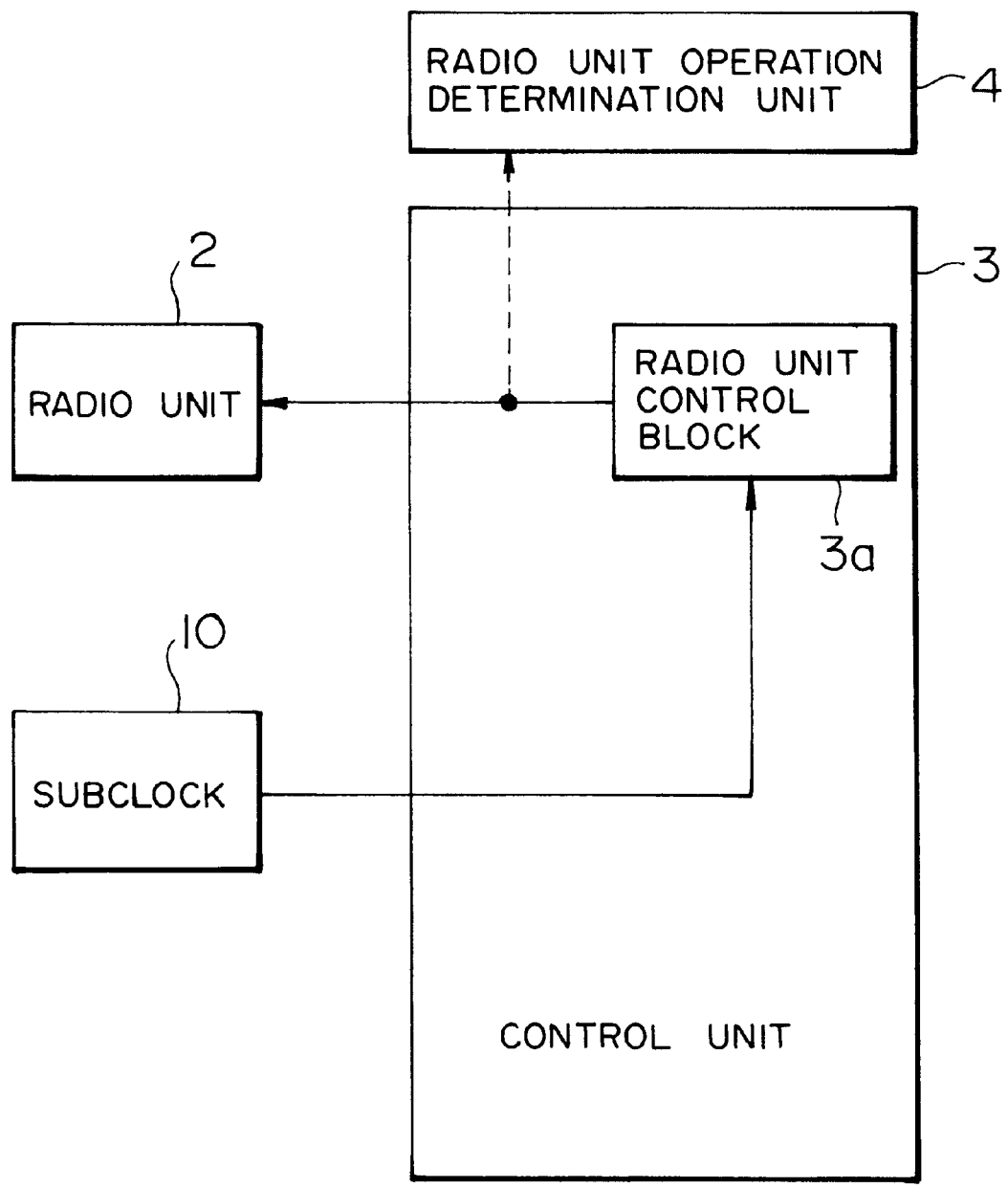
FIG. 3 is a block diagram for explaining the radio unit operation determination method of a radio unit operation determination unit.

The switch interrupt inhibit operation of this embodiment will be described below with reference to the block diagram in FIG. 1 and the flow chart in FIG. 2.

The radio unit operation determination unit 4 always monitors whether the radio unit 2 is performing the reception operation (S201). If the radio unit operation determination unit 4 determines in step S201 that the radio unit 2 is performing the reception operation, the radio unit operation determination unit 4 causes the switch interrupt control unit 6 to send the switch interrupt inhibit signal to the control unit 3. Simultaneously, the switch interrupt control unit 6 controls the display control unit 8 to cause the display unit 7 to display information of inhibition of switch interrupt processing (S206).

During the display of switch interrupt inhibition in step S206, when the user operates the switch 5 to perform switch interrupt processing (S207), the switch interrupt control unit 6 ignores the switch interrupt operation (S208), and a standby state is set while keeping the information of switch interrupt inhibition displayed (S209).

If the radio unit operation determination unit 4 determines that the reception operation of the radio unit 2 is ended (S210), the radio unit operation determination unit 4 causes the switch interrupt control unit 6 to transmit a switch interrupt inhibit cancel signal to the control unit 3. At the same time, the switch interrupt control unit 6 controls the display control unit 8 to cause the display unit 7 to end the display of the switch interrupt inhibition and switch the display to the normal standby state (S211). The flow returns to step S201, and the radio unit operation determination unit 4 monitors the operation of the radio unit 2.

If the radio unit operation determination unit 4 determines, in step S201, that the radio unit 2 is not performing the reception operation, the normal standby state is maintained (S202). If, in this state, the user operates the switch 5 to perform switch interrupt processing (S203), the switch interrupt control unit 6 transmits the switch interrupt enable signal to the control unit 3. The control unit 3 starts the main clock (S204) to start switch interrupt processing (S205).

If the control unit 3 confirms the end of the switch interrupt processing (S212), the flow returns to step S201, and the radio unit operation determination unit 4 monitors the operation of the radio unit 2.

What I claim is:

1. A radio selective calling receiver comprising:

at least one switch operated by a user to perform operations other than for supplying or terminating power to the receiver, wherein switch interrupt processing performed by operating said switch is performed by starting a main clock;

a radio unit operation determination unit for determining whether a radio unit which demodulates a radio signal received from a base station is performing a reception operation, wherein if said radio unit operation determination unit determines that said radio unit is performing the reception operation, switch interrupt processing is not performed even when the user operates said switch.

2. The receiver according to claim 1, wherein if said radio unit operation determination unit determines that said radio unit is performing the reception operation, information representing inhibition of switch interrupt processing is displayed.

* * * * *